United States Patent
Morishita et al.

(10) Patent No.: US 11,127,452 B1
(45) Date of Patent: Sep. 21, 2021

(54) APPARATUSES, SYSTEMS, AND METHODS FOR FUSE ARRAY BASED DEVICE IDENTIFICATION

(71) Applicant: MICRON TECHNOLOGY, INC., Boise, ID (US)

(72) Inventors: Yoshihito Morishita, Shibuya-ku (JP); Chikara Kondo, Hachioji (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/892,201

(22) Filed: Jun. 3, 2020

(51) Int. Cl.
| | |
|---|---|
| *G11C 11/4078* | (2006.01) |
| *G11C 29/02* | (2006.01) |
| *G11C 11/408* | (2006.01) |
| *H04L 9/06* | (2006.01) |

(52) U.S. Cl.
CPC ...... *G11C 11/4078* (2013.01); *G11C 11/4085* (2013.01); *G11C 29/027* (2013.01); *H04L 9/0643* (2013.01)

(58) Field of Classification Search
CPC .................................................. G11C 11/4078
USPC ............................................................ 365/149
See application file for complete search history.

(56) References Cited

U.S. PATENT DOCUMENTS

| | | | | |
|---|---|---|---|---|
| 6,292,422 B1 * | 9/2001 | Pitts | ............... | G11C 7/24 365/225.7 |
| 2007/0070693 A1 * | 3/2007 | Nakano | ............... | G11C 29/802 365/185.08 |
| 2008/0304347 A1 * | 12/2008 | Kenkare | ............... | G11C 17/16 365/225.7 |
| 2014/0098623 A1 * | 4/2014 | Sforzin | ............... | G11C 17/16 365/225.7 |
| 2018/0095897 A1 * | 4/2018 | Upasani | ............... | G06F 21/602 |

\* cited by examiner

*Primary Examiner* — Muna A Techane
(74) *Attorney, Agent, or Firm* — Dorsey & Whitney LLP

(57) ABSTRACT

Apparatuses, systems, and methods for fuse based device identification. A device may include a number of fuses which are used to encode permanent information on the device. The device may receive an identification request, and may generate an identification number based on the states of at least a portion of the fuses. For example, the device may include a hash generator, which may generate the identification number by using the fuse information as a seed for a hash algorithm.

15 Claims, 6 Drawing Sheets

APPARATUSES, SYSTEMS, AND METHODS FOR FUSE ARRAY BASED DEVICE IDENTIFICATION

BACKGROUND

There are many situations where it may be useful for an electronic device to have a unique identification which is tied to that device. For example, networked devices may include a MAC address, which may be unique to that device. They may broadcast this identification when requested to do so by the network, which may allow the network to, for example, identify the type of device, route data to/from that device, determine if the device may connect to the network, etc.

Conventional device identifications may be stored in a register of the device, and may be assigned when the device is manufactured. However, it may be possible for malicious actors to re-write the device identification, or copy it to a new device (e.g., to gain illicit access to a secure network). There may be a need for device identifications which are inherent to the device (e.g., based on a unique physical state of the device).

DETAILED DESCRIPTION

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Devices may have a unique identification, such as an identification number. The identification number is tied to the device, and may be broadcast by the device as part of various operations (e.g., to identify it to other devices on a network). To prevent malicious attacks, it may be useful to tie the identification number to the device to prevent tampering with the unique identification number. It may be useful to tie the identification number to one or more physical properties of the device, since it may be relatively difficult to change the physical state of the device after manufacture.

The present disclosure is directed to apparatuses, systems, and methods for fuse array based device identification. An integrated circuit device may include a fuse array which may include a large number of fuses. As part of the manufacturing/quality control process, the fuses may have their state permanently changed to modify one or more aspects of the device. For example, if the device is a memory device, the fuses may be 'blown' as part of repair operations to indicate that a particular memory address should be remapped from defective memory cells to redundant memory cells instead. A given device may have a relatively large number of fuses, each of which may be blown or not blown based on, for example, repair operations, trimming the device, or specifying settings of the device. Some of these may be based on minor differences in the manufacturing of that particular device. Accordingly, it may be highly improbably that the fuse arrays of any two devices have an exactly matching state. The state of the fuses in the fuse array may thus be used to generate a unique identification which is tied to a physical state of the device.

Figure 1:
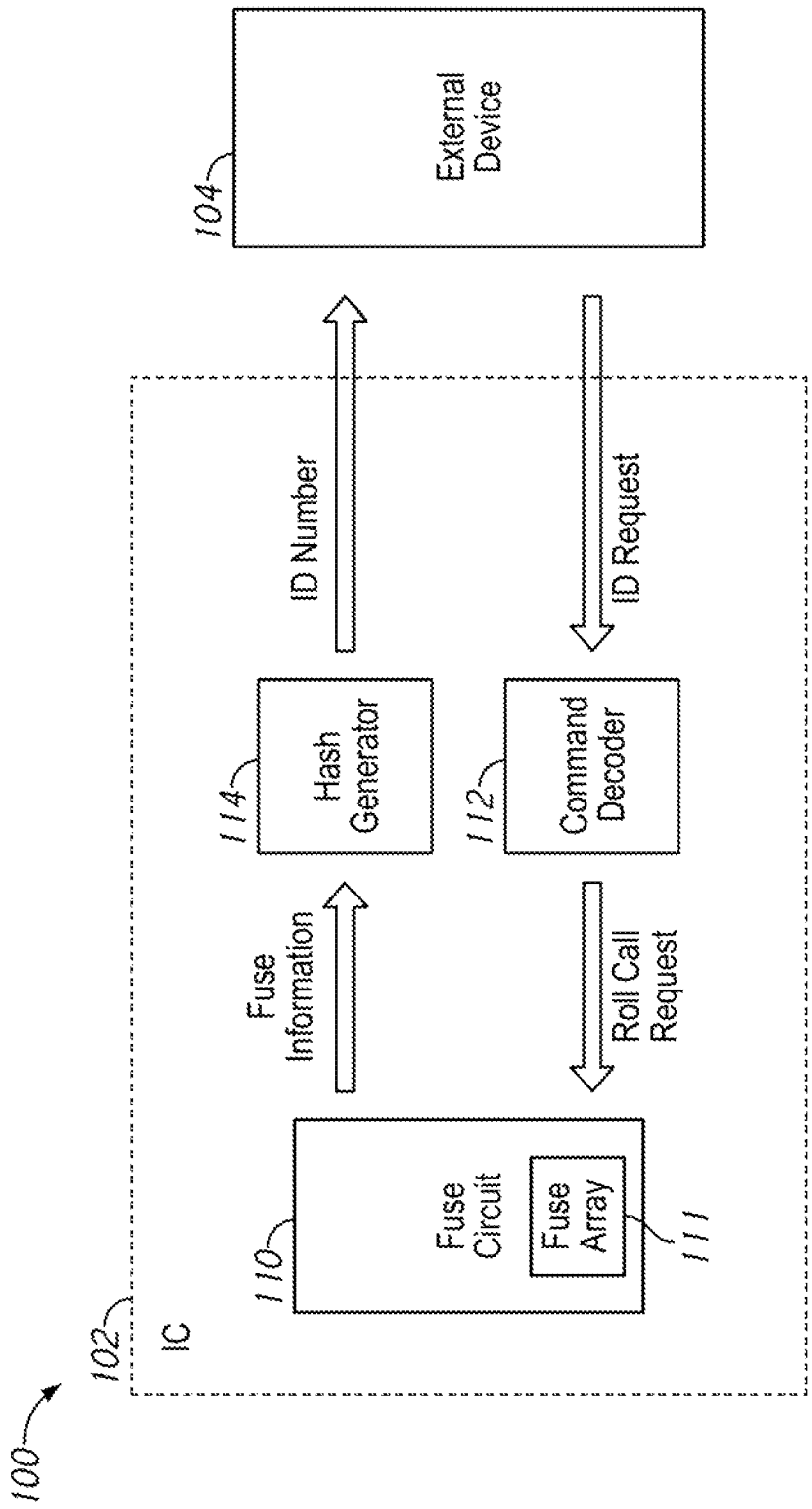
FIG. 1 is a block diagram of a system using fuse state based identification according to some embodiments of the present disclosure.

FIG. 1 is a block diagram of a system using fuse state based identification according to some embodiments of the present disclosure. The system 100 includes an external device 104 which is in communication with a device 102. The external device 104 may send a request to the device 102, which may respond with a unique identification number (e.g., a hash value) based on the state of a fuse array which is part of a fuse circuit 110 of the device 102.

The device 102 may be an integrated circuit (IC) device. In some embodiments, the device 102 may be a memory device. An example embodiment where the device 102 is a memory device will be discussed in more detail in FIG. 2. The external device 104 may be a device which is coupled to device 102. In some embodiments, the external device 104 may be a separate device which is in communication with the device 102. For example, the external device 104 may be in wired and/or wireless communication with the device 102. In some embodiments, the external device 104 may be packaged together with the device 102. For example, the device 102 may be packaged as part of a system-in-package (SiP) or system-on-chip (SoC) and the external device 104 may represent a controller of the device 102. In some embodiments the external device 104 may be in communication with other external devices, and may receive requests for identification from the device 102, pass those requests to the device 102, and then pass the identification information back to the other external devices.

The device 102 has a command decoder 112 which receives a request for identification information from the external device 104. The request for identification information may be a finger print request. Responsive to the finger print request, the command decoder 112 may activate various components of the device 102 to produce the identification number.

The command decoder 112 may provide a roll call request to a fuse circuit 110. The roll call request may cause the fuse circuit 110 to generate a fuse information signal which is based on the state of all or some of the fuses in a fuse array of the fuse circuit 110. The fuse circuit 110 may include a fuse array 111. The fuse array may include a number of fuses and/or anti-fuses which may be permanently 'blown' as part of manufacturing, quality control, and/or other steps of preparing the device 102.

Each fuse/anti-fuse may have an initial state and a blown state. For example, in the initial state, a fuse may be a conductive element, while in the blown state, the fuse may be non-conductive. An anti-fuse may be initially non-conductive and may be conductive once blown. The fuses/anti-fuses may be 'blown' by a process which is irreversible. For example, permanent changes may be made to the structure of the circuit element which forms the fuse/anti-fuse such as applying a large voltage (e.g., greater than a threshold voltage) across the fuse/anti-fuse, or etching the fuse/anti-fuse with a laser. Accordingly, each fuse/anti-fuse may represent a binary bit with a permanent state, and the state of the fuses/anti-fuses in the fuse array 111 may be used to permanently encode information on the device 102.

Fuse arrays, such as fuse array 111, may generally be referred to as including fuses, however it should be understood that fuse arrays as discussed herein may include fuses, anti-fuses or a mixture thereof.

The fuses in the fuse array 111 may be blown as part of manufacture, quality control and/or other processes involved in the production of the device 102. For example, some fuses may be tied to specific settings of the memory, and the fuses may be blown to encode information related to those settings. Some fuses may be tied to adjustable parameters of the device, and the fuses may be blown to tune the operation of the device. The fuses may be tied to specific operations (e.g., memory access operations) and the fuses may be blown to repair the device 102 (e.g., by re-routing information around damaged sections of the device 102).

The fuse circuit 110 may be used to access the fuse array 111 in order to read out the information of all or part of the fuse array 111. For example, the fuse circuit 110 may receive a request for information, such as the roll call request, which causes it to check the status of the specified fuses of the fuse array 111 and then provide a signal, such as the fuse information signal, with a bit corresponding to each fuse that was checked. The bit(s) of the fuse information may be in a first state if the associated fuse was not blown and a second state if the associated fuse was blown. Requests to read information may include a fuse array address, which may specify which of the fuses are read. In some embodiments, a request may cause the state of all fuses to be read out. In some embodiments, the roll call request may target a specific group of fuses in the fuse array 111 which are likely to have greater variation from device to device. For example, the roll call request may be directed towards a region of the fuse array 111 used to repair the device 102, since the specific repairs required may vary randomly from device to device.

In some embodiments, the roll call request may cause the fuse circuit 110 to return information about which of the fuses in all or a portion of the fuse array 111 have been blown. For example, rather than specify an address and read out fuse information about if the fuse is blown or not, the roll call request may cause the fuse circuit 110 to provide the addresses of all (or a specified portion) of the fuses which have been blown.

The fuse array 111 may include a large number of fuses. For example, the fuse array 111 may include tens of thousands of individual fuses. Accordingly, if there are, for example, 50,000 fuses then the fuse array may have 2^50,000 possible states. Since some of the states of the fuses may be based on characteristics which are unique to a particular device, the state of the fuse array 111 may generally be considered to be unique to a given device.

The device 102 may include a hash generator 114. The hash generator 114 may be a circuit which performs one or more operations to generate the ID number based on the received fuse information. For example, the hash generator 114 may perform an algorithm of binary arithmetic on the received fuse information to generate the ID number. In some embodiments, the ID number may have a different number of bits than the fuse information. The ID number may be a string of binary bits which represents a binary number. In some embodiments, the hash generator 114 may be a cryptographic hash generator. In some embodiments, the hash generator 114 may be an implementation of a cryptographic hash function, such as SHA-256.

In this manner, the device 102 may receive a finger print request and provide an ID number which is based on the state of all or part of the fuses in a fuse array 111 of the device. Since the fuse array 111 may have a huge number of potential states, and since the fuse array 111 may vary from device to device, the ID number may have a statistically low chance of matching any other device's ID number. The ID number may be considered to be unique, and inherently tied to the device 102, since it may be relatively difficult to change the state of the fuse array 111 after the device 102 is packaged.

In some embodiments, a fuse array based ID number may function as a MAC address or public key of the device 102. A potential advantage of using a fuse array based ID number may be that the ID number can be verified by the manufacturer of the device 102. For example, if the ID number is based off of a portion of the fuse array 111 used for repair operations, then a record of which repair operations were performed on which devices may be pulled to determine the fuse information for a given device. Based on the known fuse information, the ID number can be determined if the workings of the hash generator 114 are also known. In this manner, a device manufacturer may be able to verify the ID number of a device based on their repair logs.

Figure 2:
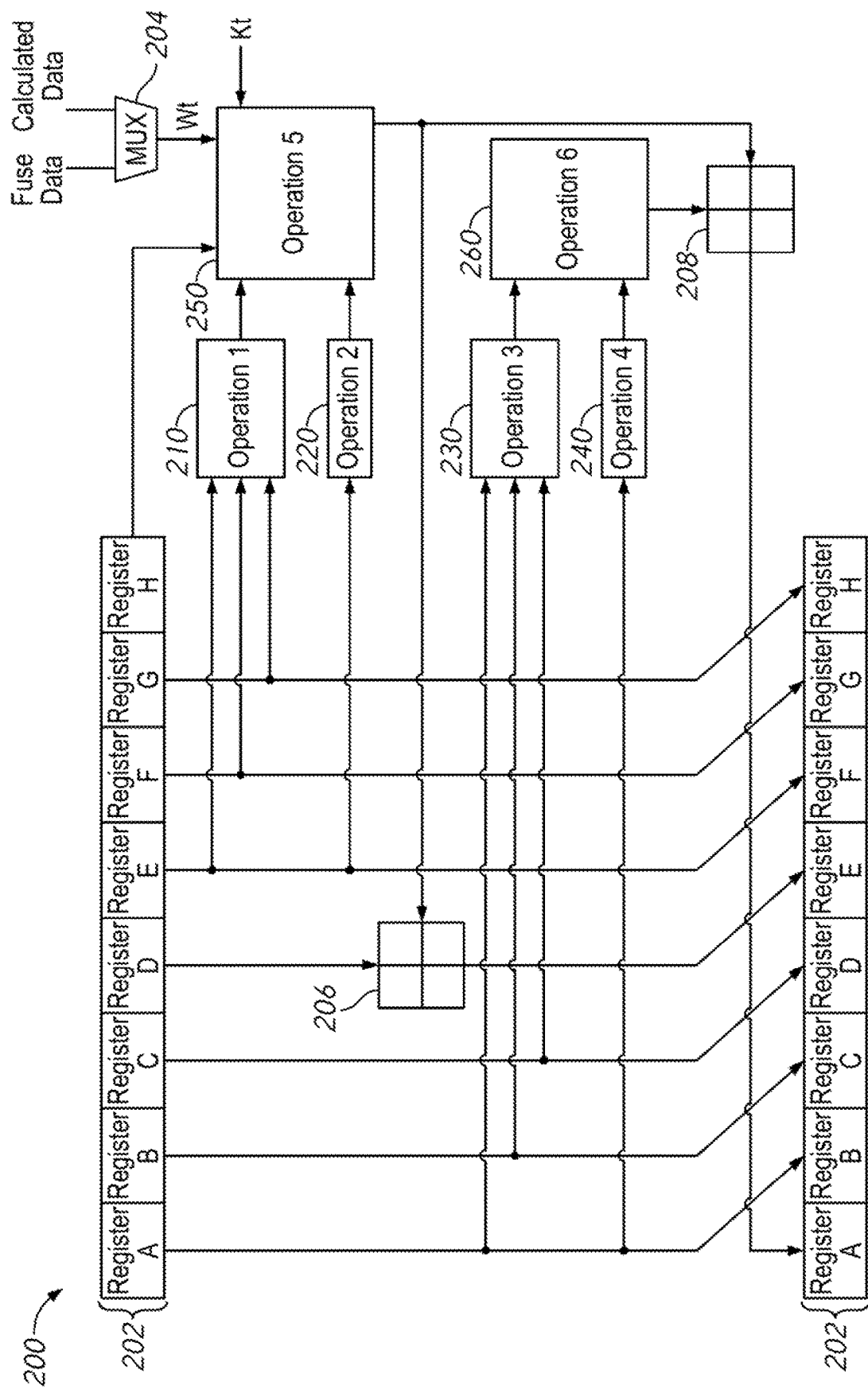
FIG. 2 is a block diagram of a hash generator according to some embodiments of the present disclosure.

FIG. 2 is a block diagram of a hash generator according to some embodiments of the present disclosure. The hash generator 200 may, in some embodiments, be included in the hash generator 114 of FIG. 1. The hash generator 200 may represent circuits and data structures used as part of a particular cryptographic hash algorithm used to generate an identification number (e.g., a hash) from a set of fuse data. It should be understood that different circuits and data structures may be used in other example embodiments which have variations in the hash algorithm used, the number of bits of fuse information received, the number of bits in the received fuse information or provided ID number, etc.

The hash generator 200 may represent an implementation of a secure hash algorithm (SHA), which as shown in FIG. 2 may be a 256 bit algorithm (e.g., SHA-256). The hash generator 200 may operate in two phases. In a first phase, the hash generator may receive a set of fuse information, perform calculations, store that calculated data in one or more registers 202 and then receive another set of fuse information which may be used in a calculation along with the calculated data to generate new data to store in the registers. This loop may repeat until all the fuse information has been loaded into the hash generator 200, the hash generator may enter a second phase, where the data is output from the registers 202 goes through calculations and then is stored in the registers again. In some embodiments, there may be a different number of 'loops' in the first phase and the second phase. For example, there may be 16 loops in the first phase (e.g., Loop0-Loop15) and 48 loops in the second phase (e.g., Loop16-Loop63). Once the loops are complete, the hash generator may provide the data in the registers 202 as the ID number.

The hash generator 200 may include a set of registers 202, which are used to store information that the hash generator 200 is performing calculations on. For ease of illustration, the same set of registers 202 has been shown two times in the hash generator 200. The registers 202 may contain initial data, which they provide to the operation circuits 210-260 of the hash generator 200, which then generate calculated data which they provide as inputs to the registers 202.

The initial values of the registers 202 (e.g., at the beginning of Loop0) may be a defined initial value. For example, the initial values of the registers 202 at the beginning of Loop0 may be given by a federal specification related to SHA-256. In some embodiments the initial value may be stored on the device (e.g., in a non-volatile storage area) and then the hash generator 200 may load that value into the registers to initialize them. In some embodiments, the initial value may be stored on the device by blowing a fuse which has an address which is the initial value, this address may then be loaded into the registers 202. The registers are shown here labelled A-H. Each of the individual registers A-H may, in some embodiments, store 32 bits of data (e.g., for a total of 256 bits in the registers).

In general, in a given loop, the starting value in the registers 202 may be shifted. So a value of register A may be loaded into Register B, the value of register B may be loaded into register C etc. The starting value of Register H may be fed through various operation circuits 210-260, and then loaded into register A. The operations may be based, in part, on a value Wt, which may be based on data from the fuse array during the initial loops (e.g., Loop0-Loop15) or based on the calculations of the hash generator 200 on later loops (e.g., Loop16-Loop63). Additional registers (not shown) may store the initial values of the weight during the initial loops, and then those values may be retrieved for calculations during later loops. The value Wt may, in some embodiments, be a 512-bit value. The operations may also be based on a weight Kt, which may be a constant of the device. For example, the weight Kt may be stored on the device (e.g., in non-volatile memory). In some embodiments, the weight Kt may be encoded in the fuse array.

In addition to the operation blocks 210-260, the hash generator 200 includes modulo arithmetic blocks 206 and 208. Each of these may represent performing modulo arithmetic on an input value (e.g., Register D for block 206 and the output of operation 6 260 for block 208) based on a divisor (e.g., the output of block 5 250 for both blocks 206 and 208). This may output the remainder of that division (e.g., to register E for block 206 and to register A for block 208).

Operation block 1 210 performs an operation based on the values stored in registers E, F, and G. In the following equations, a bold and italics letter indicates the value which was stored in the register corresponding to that letter. The operation of block 1 210 is given by Equation 1, below:

$$Ch(E,F,G)=(E \text{ AND } F)\text{XOR}(/E \text{ AND } G) \qquad \text{Eqn. 1}$$

where AND represents the logical AND function, and XOR represents the logical exclusive or function. The value /E represents an inverse of the value which was stored in the register E.

Operation block 2 220 performs an operation based on the value stored in register E. The operation of block 2 is given by Equation 2, below:

$$\Sigma\{512\}\ldots 1(E)=\text{ROTR\_6}(E)\text{XOR ROTR\_11}(E) \\ \text{XOR ROTR\_25}(E) \qquad \text{Eqn. 2}$$

where ROTR_n(X) represents an n bit round shift right of the value X.

Operation block 3 230 performs an operation based on the values stored in the registers A, B, and C as given by Equation 3, below:

$$Maj(A,B,C)=(A \text{ AND } B)\text{XOR}(A \text{ AND } C)\text{XOR}(B \text{ AND } C) \qquad \text{Eqn. 3}$$

Operation block 4 240 performs an operation based on the value stored in register A, as given by Equation 4, below:

$$\Sigma\{512\}\_1(A)=\text{ROTR\_2}(A)\text{XOR ROTR\_13}(A)\text{XOR} \\ \text{ROTR\_22}(A) \qquad \text{Eqn. 4}$$

Operation block 5 250 performs an operation based on the values in registers H, E, F, G, as well as the values Kt and Wt as given by Equation 5, below:

$$T1=H+\Sigma\{512\}\_1(E)+Ch(E,F,G)+Kt+Wt \qquad \text{Eqn. 5}$$

where the symbol '+' represents Modulo arithmetic, the value Kt is a constant, and the value of Wt is given by the multiplexer 204 and the other two terms represent the outputs of blocks 220 and 210. The value of Wt varies depending on which loop the hash generator 200 is currently on. The value of Wt may be given by Equation 6, below:

$$W_t = \begin{cases} M_t^{(i)} & 0 \le t \le 15 \\ \sigma_1^{\{256\}}(W_{t-2}) + W_{t-7} + \sigma_o^{\{256\}} + (W_{t-15}) + W_{t-16} & 16 \le t \le 63 \end{cases} \qquad \text{Eqn. 6}$$

In Eqn. 6, the index t represents a loop counter, and the value M represents raw data from the fuse array (e.g., based on the roll call request to the fuse array 111 of FIG. 1). Accordingly, the value of Wt may initially be directly loaded from the fuse array for the first sixteen loops (e.g., loops 0 to 15). Subsequent loops (e.g., loops 16 to 63) may use one or more previous values of Wt to calculate a new value of Wt. Accordingly, previous values of Wt may be stored (e.g., in additional registers of the hash generator 200, not shown). There may be 16 additional registers (e.g., for the weights $W_0$ to $W_{15}$) each of which may store a 512 bit value of Wt (e.g., for 8192 total bits of additional storage). The values $\sigma_0$ and $\sigma_1$ are given by equations 7 and 8, below:

$$\sigma_0(Wt-2)=\text{ROTR\_17}(Wt-15)\text{XOR ROTR\_19}(Wt-15) \\ \text{XOR ROTR\_10}(Wt-15) \qquad \text{Eqn. 7}$$

$$\sigma_1(Wt-15)=\text{ROTR\_17}(Wt-2)\text{XOR ROTR\_19}(Wt-1) \\ \text{XOR ROTR\_10}(Wt-2) \qquad \text{Eqn. 8}$$

Operation block 6 260 performs an operation which is a modulo addition of the outputs of blocks 240 and 230 as given by Equation 9, below:

$$T2=\Sigma\{512\}\_1(A)+Maj(A,B,C) \qquad \text{Eqn. 9}$$

In this manner the fuse information may act as a 'seed' for the hash generator 200. The hash generator may perform a sequence of loops, each of which involve making a variety of calculations, in order to eventually generate an identification number based on the seed. It should be understood that while the hash generator 200 has been described as using a particular algorithm with certain, number of loop and certain sizes of different values (e.g., 64 loops, 256 bit output, etc.), other values and other number of loops may be used in other example embodiments.

Figure 3:
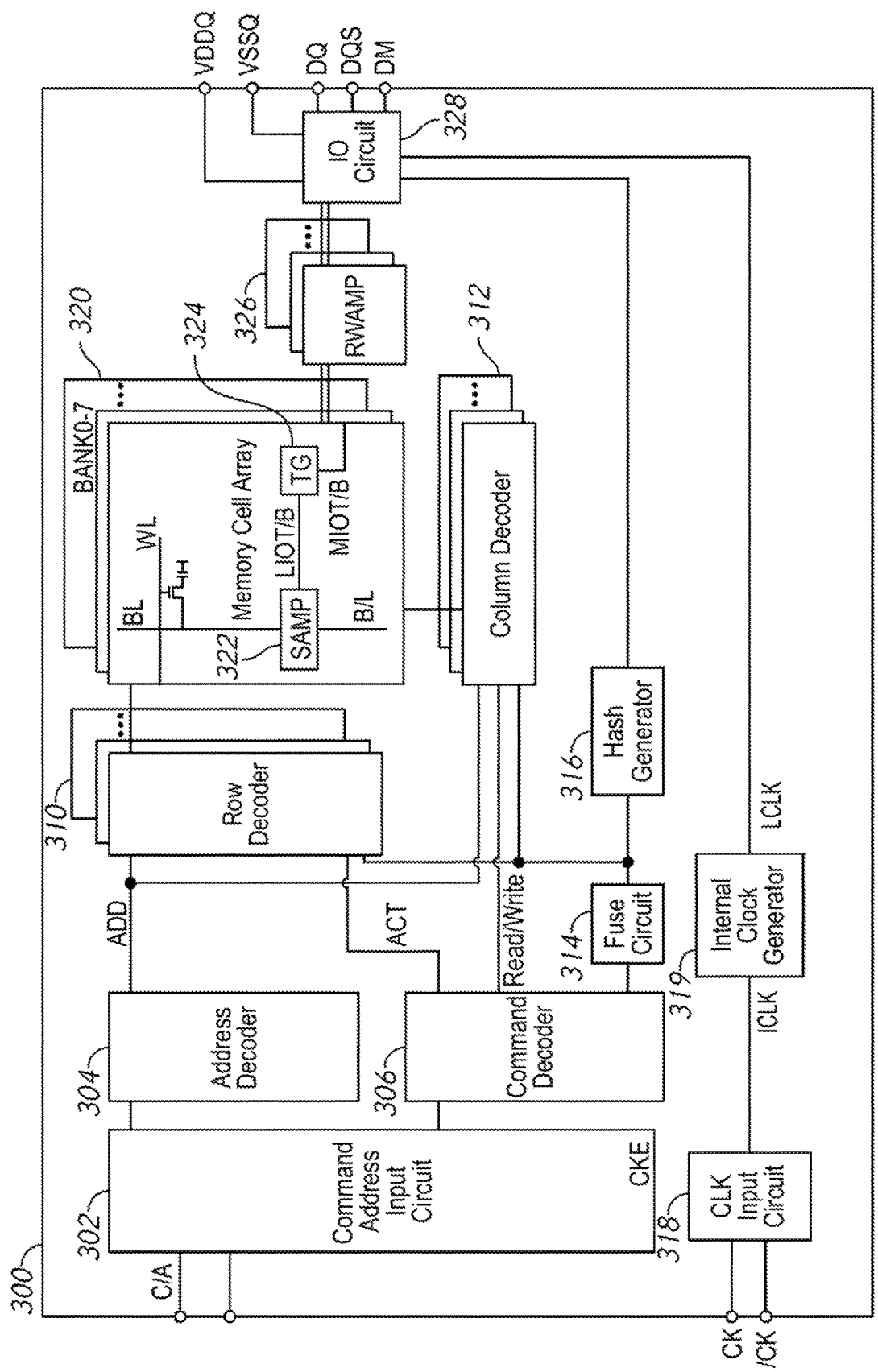
FIG. 3 is a block diagram of a memory which uses a fuse based identification system according to some embodiments of the present disclosure.

FIG. 3 is a block diagram of a memory which uses a fuse based identification system according to some embodiments of the present disclosure. The memory device 300 may, in some embodiments, be an implementation of the device 102 of FIG. 1.

The memory device 300 includes a memory array 320, which may be used to store information. The memory array 320 includes a number of memory cells. Each memory cell may store information. For example, each memory cell may store a single bit of information. The memory cells may be organized at the intersection of word lines WL (rows) and bit lines BL (columns). Each memory cell may thus be specified by a row address (which specifies a particular word line) and a column address (which specifies a particular bit lines). The memory array 320 may be organized into one or more banks, each of which may be specified by a bank address. In the example of FIG. 3, the memory array 320 includes 8 memory banks (e.g., Bank0-Bank7), however other embodiments may include more or fewer banks (e.g., 4 or 16 banks). In some embodiments, the memory array 320 may not be organized into banks, and the bank address may be omitted.

The memory device 300 includes a command/address input circuit 302, which may receive information along command/address (C/A) terminals of the memory 300. The C/A terminal may receive instructions from outside the device and may route those instructions (and/or generate internal signals based on those instructions) to execute the operations specified in the instructions. For example, the memory device 300 may include instructions along the C/A terminals which specify a read or write operation and address information which specifies the memory cells to perform that operation on.

The C/A input circuit 302 may pass received address information to an address decoder 304, which may provide one or more addresses ADD, such as a row address, column address, and/or bank address. The C/A input circuit 302 may pass received command instructions on to a command decoder 306. The command decoder 306 may route the command instructions and/or generate internal signals to activate the components involved in the instructed operation, and/or to instruct those components on what to do. For example, the command decoder 306 may provide a row activation signal ACT to the row decoder 310, which may cause the row decoder 310 to activate a word line WL specified by the address ADD from the address decoder 304. The command decoder 306 may also provide a read or write signal Read/Write to a column decoder 312, which may activate one or more specified bit lines BL based on a column address ADD from the address decoder 304, and read or write data to or from memory cells at the intersection of the activated bit line and the activated word line.

The bit lines BL of the memory array 320 may be coupled to a sense amplifier 322, which may be used to read a logical value from an activated memory cell along that bit line or to write a logical value to an activated memory cell along that bit line. The sense amplifier 322 may be coupled via local input/output lines LIOT/B to a transfer gate, which may couple multiple LOT/B lines to a main input/output line MIOT/B. The MIOT/B lines may be coupled outside the memory array 320 to a read/write amplifier 326, which may couple the signals along the MIOT/B lines to an input/output circuit 328. The read/write amplifiers may act to convert voltages used within the memory array 320 to voltages used outside the memory array.

The IO circuit 328 may couple data into and out of the memory via data terminals such as DQ, DQS, and DM. The IO circuit 328 is also coupled to external voltages VDDQ and VDDS, which may act as power supplies for various amplifiers and other circuits used in the IO circuit 328. The memory 300 may also have additional voltages, which may be provided from additional voltage terminals and/or generated by an internal voltage generator (not shown) of the memory 300. In some embodiments, the external voltages VDDQ and VDDS may be IO voltages which power the IO circuit 328, while other circuits are powered by other voltages to reduce noise. The IO circuit 328 may also be coupled to clock signals, such as LCLK, which may be used to control timing of input and output operations.

The memory 300 includes clock terminals CK and /CK which receive an external clock signal (e.g., from a system that the memory 300 is coupled to). The memory 300 includes a clock input circuit 318 which may receive the external clock signal and reformat it to provide an internal clock signal ICLK. An internal clock generator 319 may then provide one or more local clock signals LCLK based on the internal clock signal.

In some embodiments, certain elements of the memory 300, such as the row decoder 310, column decoder 312, and/or read/write amplifiers 326 may be bank specific. For example, there may be a first row decoder 310 for a first bank, a second row decoder 310 for a second bank, etc. In some embodiments, such components may be located at a bank logic region which is proximate to the physical location of that bank of the memory array 320 on a die containing the memory device 300.

The memory 300 may also include a fuse circuit 314, which may include (or be coupled to) a fuse array. The fuse circuit 314 may, in some embodiments, be included in the fuse circuit 110 of FIG. 1. The fuse circuit 314 may read out the states of various fuses and use them to modify the operation of the memory device 300. For example, the fuse array may have various fuses which correspond to settings of the memory 300, which may be read by the fuse circuit 314, which may then generate signals which modify the operation of the memory 300 based on the state of those setting fuses.

The fuse array and fuse circuit 314 may be used for repair operations of the memory 300. The memory array 320 may have a large number of memory cells, arranged along bit lines BL and word lines WL. Some of these memory cells may be inaccessible due to, for example, manufacturing defects, damage, or other problems with the memory array 320. During the manufacturing or quality control of the memory device 300, the memory array 320 may be tested to locate inaccessible memory cells. The memory 300 may then undergo a repair operation where fuses in the fuse array are blown to remap an address so that instead of being associated with the inaccessible memory cell, it is associated with a usable memory cell instead.

In an example repair operation, the memory array 320 may include a set of memory cells organized along normal word lines, and a set of redundant memory cells organized along redundant word lines. If a defective memory cell is located, then fuses in the fuse array may be blown to indicate that the row address which previously was associated with the word line including the defective memory cells is now associated with one of the redundant rows of memory. Accordingly, when an row address is received which refers to that word lie, the fuse circuit 314 may communicate to the row decoder 310 that the redundant row of memory should be activated instead of the original row. Repair operations may also be performed on a bit line-by-bit line basis in an analogous fashion.

The memory 300 includes a hash generator circuit 316 which may, in some embodiments, be included in the hash generator circuit 114 of FIG. 1 and/or 200 of FIG. 2. When the memory device 300 includes a request for fuse information (e.g., at the C/A terminals), the C/A input circuit 302 may provide the request (and/or signals based on the request) to the command decoder 306, which may cause the fuse circuit 314 to provide fuse information to the hash generator 316. The hash generator 316 may then generate an identification number based on the fuse information and then provide the ID number to the IO circuit 328. The IO circuit 328 may then provide the ID number along the data terminals (e.g., DQ) where the ID number may be received by an external device.

The section of the fuse array which is used for repair operations may be especially useful for generating an identification number, since the repair operations performed may have a relatively high level of variability from device to device. In some embodiments, the request for fuse information may specify a section of the fuse array which is used for repair operations, and the ID number may be based on the state of the fuses in the repair section of the fuse array.

Figure 4:
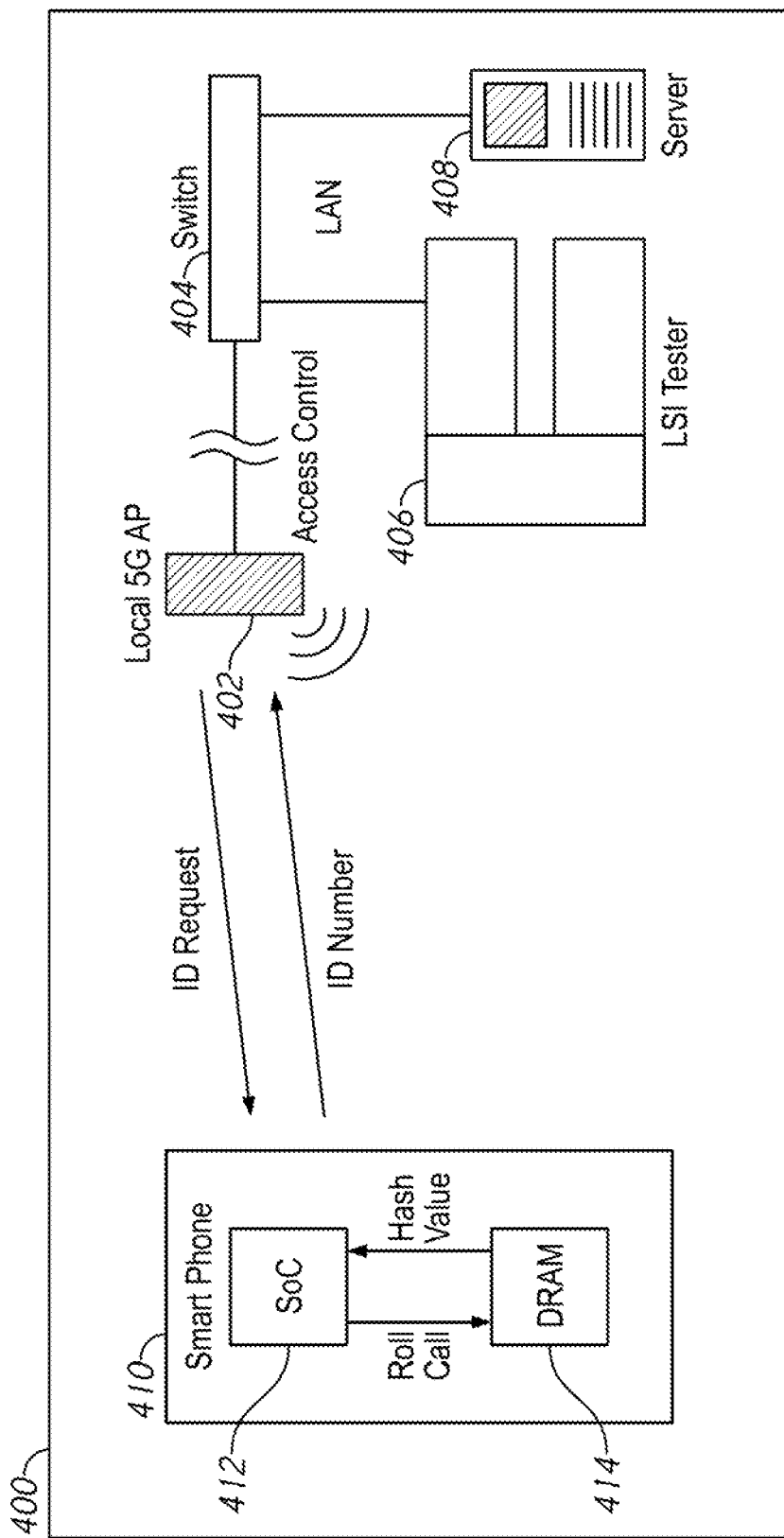
FIG. 4 is a block diagram of a device connecting to a secure network using a fuse based identification number according to some embodiments of the present disclosure.

FIG. 4 is a block diagram of a device connecting to a secure network using a fuse based identification number according to some embodiments of the present disclosure. The environment 400 of FIG. 4 represents an example application of a system using fuse based ID numbers, such as the system 100 of FIG. 1. In particular the environment 400 represents a secure environment where only certain devices, such as the mobile device 410, are authorized to connect to a network. The network (e.g., access point 402) may determine if the device 410 is allowed to access the network (and/or which parts of the network may be accessed) based on the fuse based ID number broadcast by the mobile device 410.

The environment 400 may be an environment where access is completely or partially restricted to one or more components of a network. For example, the environment 400 may represent a factory, such as a factory which produces memory devices. The factory may include devices, such as a chip tester 406 and server 408 which can be accessed remotely via a network. A user, such as an employee of the factory, may be equipped with a mobile device 410, such as a cell phone, tablet, or laptop, which may be used to access such devices. For example, data may be retrieved from or stored in the server 408, and results may be retrieved from the tester 406 or instructions loaded onto the tester 406. However certain features of these components and/or operations which can be performed remotely may be restricted.

The mobile device 410 includes a memory 414, such as a DRAM memory, and a controller 412. The controller 412 may be packaged together with the memory 414 as part of a system on chip (SoC). When the mobile device 410 tries to access the network through the local access point 402 (or when the mobile device 410 tries to access a secure portion of the network) the access point 402 may provide an identification request to the device 410. The controller 412 may receive the ID request and then generate an internal fuse information request which it provides to the memory 414. The memory may respond by generating an identification number based on the state of all or a portion of the fuses in the fuse array of the memory. This identification number may then be provided by the mobile device 410 back to the local access point 402. The local access point 402 may then decide whether or not (or how much) access to grant to the mobile device 410 based on the identification number. Based on that decision the local access point 402 may coordinate with a network switch 404 to grant access to some or all of the network resources such as the tester 406 and/or server 408.

Figure 5:
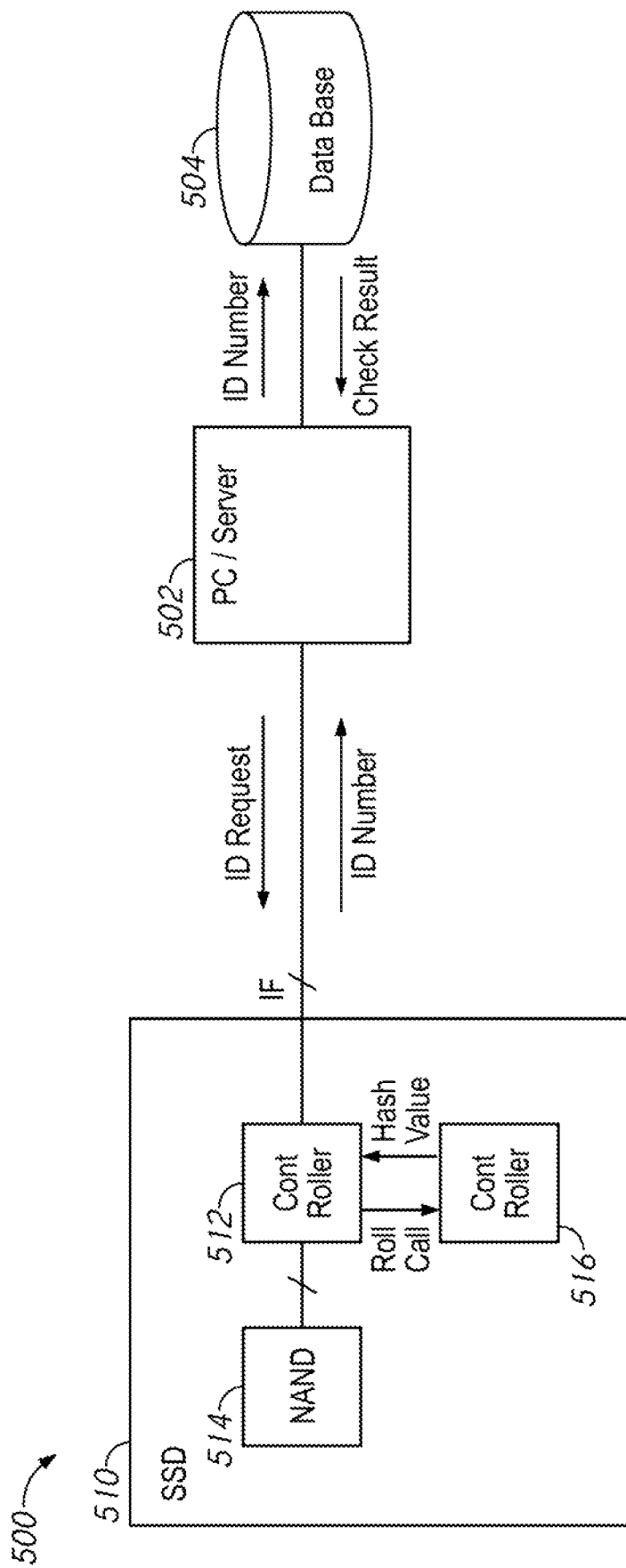
FIG. 5 is a block diagram of a system component identifying itself using a fuse based identification number according to some embodiments of the present disclosure.

FIG. 5 is a block diagram of a system component identifying itself using a fuse based identification number according to some embodiments of the present disclosure. The system 500 may, in some embodiments, be an example implementation of the system 100 of FIG. 1. In the system 500, a memory device 510, such as a solid state drive (SSD) may communicate with a host device 502, such as a computing device, to identify the memory device 510 to the host device 502.

There may be scenarios where it is important to ensure that the same physical memory devices are attached to a computing system 502. For example, this may help ensure that a storage device 510 is not replaced as part of an attempt to steal data from the computing system 502. The memory device 510 includes a controllers 512 and a storage array 514 (e.g., such as a NAND array) along with a memory 516.

The computing system 502 may provide an ID request to the memory device 510. The controller 512 may provide a fuse information request to the memory 516, which may generate an ID number based on the fuse array of the memory 516. The memory device 510 may provide the ID number to the computing device 502, which may compare the ID number to a list of permissible ID numbers in a database 504. If there is a match, the computing device 502 may access the storage array 514 of the memory device 510. If there is not a match, the computing device 502 may lock out the memory device 510 and may send one or more alerts or errors.

There may be other example environments where a fuse based identification system may be useful. For example, a mobile device which is carried on a user's person, such as a cell phone or a key fob, may include a fuse array and may generate a unique identification number based on the fuse array when requested. This may allow the user to access a secure area such as opening a door lock or allowing access the environmental controls of a 'smart home'.

Figure 6:
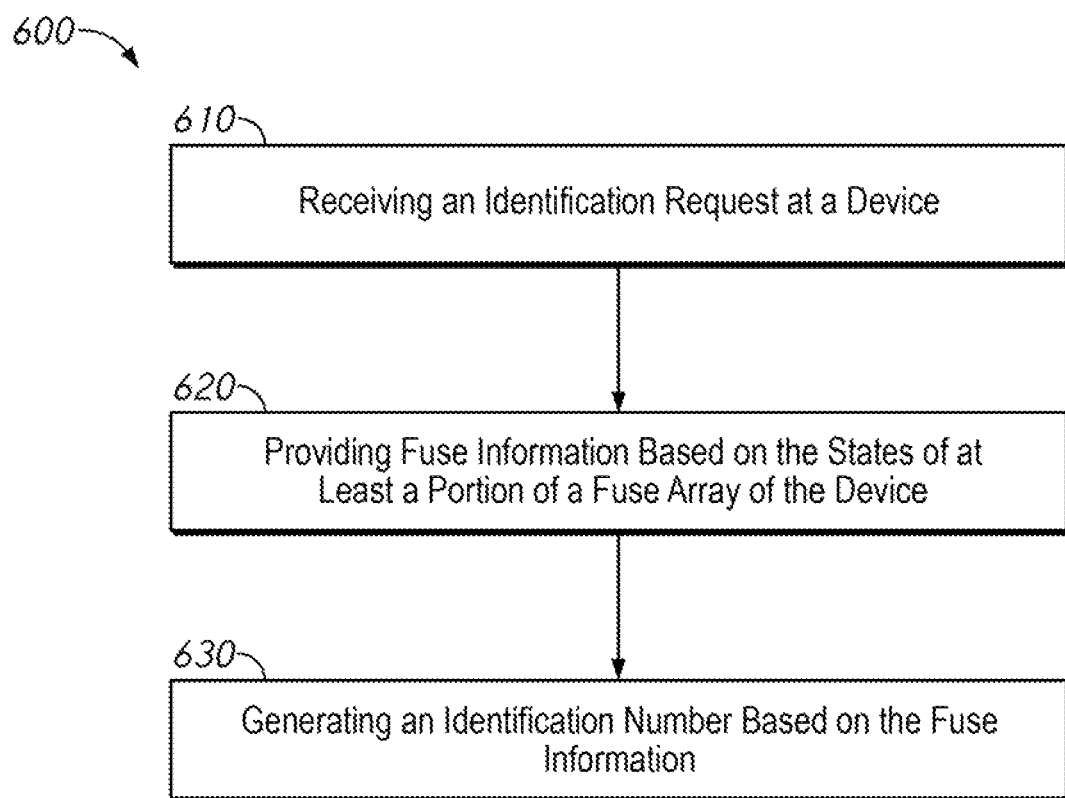
FIG. 6 is a flow chart depicting a method of identifying a device using a fuse based identification number according to some embodiments of the present disclosure.

FIG. 6 is a flow chart depicting a method of identifying a device using a fuse based identification number according to some embodiments of the present disclosure. The method 600 may, in some embodiments, be implemented by one or more of the apparatuses and/or systems of FIGS. 1-5.

The method 600 may generally begin with box 610, which describes receiving an identification request at a device. The identification request may be provided by another device (e.g., a computing device, a wireless access point) and/or may be provided by another component of the device (e.g., a controller or processor of the device). In some embodiments, the device may be a memory device, such as a DRAM chip. The device may have command and address (C/A) terminals which receive the identification request.

Box 610 may generally be followed by box 620, which describes providing fuse information based on the states of at least a portion of a fuse array of the device. The device may include a fuse circuit, which may be coupled to a fuse array. The fuse array may have a variety of fuses which are used to permanent encode information in the device. For example, the fuse array may include fuses which are used to include settings of the device. The fuse circuit may provide fuse information which is based on which of the fuses have been blown. In some embodiments, the device may include a C/A input circuit, which may generate an internal fuse status request and the fuse circuit may provide the fuse information responsive to the fuse status request.

In some embodiments, the device may be a memory device and at least a portion of the fuses may be used for repair operations. For example, during a repair operation, one or more fuses of a repair portion of the fuse array may be blown to remap an address from a normal word line to a redundant word line. The fuse status request may specify information about a set of fuses which includes a repair portion of the fuses.

Box 620 may generally be followed by box 630, which describes generating an identification number based on the fuse information. The identification number may be generated by a hash generator, which may use the fuse information as a seed. The identification number may be provided at a data terminal of the device.

In some embodiments, the method 600 may include comparing the identification number to a database and, for example, granting access to the device, revoking access to the device, operating a second device, or identifying the device. In some embodiments, the identification number may be based on repair fuses of the device, and the method 600 may include validating the identification number based on a log or record of the repair operations.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
    a fuse circuit configured to provide fuse information based on the status of a plurality of fuses responsive to a fuse status request;
    a memory array separate from the plurality of fuses, the memory array comprising a plurality of word lines each associated with a row address and a plurality of redundant word lines, wherein the fuse information includes a repair portion used to repair selected ones of the plurality of word lines by remapping the row addresses associated with the selected ones of the plurality of word lines to selected ones of the redundant word lines; and
    a hash generator configured to generate an identification number associated with the apparatus based on the fuse information, wherein the fuse information used to generate the identification number includes the repair portion.

2. The apparatus of claim 1, further comprising a command/address circuit configured to provide the fuse status request responsive to an external identification request.

3. The apparatus of claim 1, wherein the hash generator is a secure hash algorithm (SHA) circuit.

4. The apparatus of claim 1, wherein the fuse status request is a roll call request of the fuse circuit, and wherein the fuse information comprises identifying information about which of the plurality of fuses are blown.

5. The apparatus of claim 1, wherein the identification number is provided to an external data terminal of the apparatus.

6. A system comprising:
    a first device configured to provide an identification request; and
    a second device comprising:
        a plurality of fuses; and
        a memory array separate from the plurality of fuses, the memory array comprising a plurality of word lines each associated with a row address and a plurality of redundant word lines,
    wherein the plurality of fuses includes a repair portion used to repair selected ones of the plurality of word lines by remapping the row addresses associated with the selected ones of the plurality of word lines to selected ones of the redundant word lines, and wherein responsive to the identification request, the second device is configured to generate an identification number based on at least some of the plurality of fuses including the repair portion and provide the identification number to the first device.

7. The system of claim 6, wherein the first device is a network access point and the second device is a wireless device.

8. The system of claim 6, wherein the first device is a computing device and wherein the second device includes a storage array.

9. The system of claim 6, wherein the second device includes a hash generation circuit configured to generate a hash value based on the at least some of the plurality of fuses, and wherein the identification number includes the hash value.

10. A method comprising:
    receiving an identification request at a device, which includes a memory array separate from the plurality of fuses, the memory array comprising a plurality of word lines each associated with a row address and a plurality of redundant word lines;
    repairing selected ones of the plurality of word lines by programming a repair portion of a fuse array to remap the row addresses associated with the selected ones of the plurality of word lines to selected ones of the redundant word lines;
    providing fuse information based on states of at least a portion of the fuse array of the device including the repair portion; and
    generating an identification number based on the fuse information.

11. The method of claim 10, further comprising providing the identification number to a second device, wherein the second device provided the identification request.

12. The method of claim 10, wherein generating the identification number includes generating a hash value based on the fuse information.

13. The method of claim 10, further comprising generating a fuse roll call request responsive to the identification request.

14. The method of claim 10, further comprising validating the identification number based on a record of the repair operations.

15. The method of claim 10, further comprising comparing the identification number to a database and performing at least one of granting access to the device, revoking access to the device, operating a second device, or identifying the device.

* * * * *